United States Patent [19]

Lee

[11] Patent Number: 5,220,831

[45] Date of Patent: Jun. 22, 1993

[54] CLOSED LOOP TEMPERATURE COMPENSATION FOR ACCELEROMETER CURRENT SCALE FACTOR

[75] Inventor: William F. Lee, Redmond, Wash.

[73] Assignee: Sundstrand Corporation, Rockford, Ill.

[21] Appl. No.: 738,269

[22] Filed: Jul. 31, 1991

[51] Int. Cl.⁵ .......................................... G01P 15/13
[52] U.S. Cl. ..................................... 73/497; 73/517 B
[58] Field of Search ............................. 73/497, 517 B

[56] References Cited

U.S. PATENT DOCUMENTS

| | | | |
|---|---|---|---|
| 3,030,814 | 4/1962 | Ainsworth | 73/503 |
| 3,708,754 | 1/1973 | Diehl | 330/1 A |
| 4,128,010 | 12/1978 | Aske | 73/497 |
| 4,144,764 | 3/1979 | Hartzell, Jr. | 73/497 |
| 4,336,718 | 6/1982 | Washburn | 73/517 B |
| 4,430,894 | 2/1984 | Albert et al. | 73/497 |
| 4,694,696 | 9/1987 | Hojo et al. | 73/497 |
| 4,697,455 | 10/1987 | Norling | 73/497 |
| 4,887,467 | 12/1989 | Sakuma et al. | 73/517 B |

Primary Examiner—John E. Chapman
Attorney, Agent, or Firm—Fitch, Even, Tabin & Flannery

[57] ABSTRACT

A temperature compensation system for a force balance accelerometer is disposed within a feedback loop. A series resistor (82) is connected in series with torque coils (30,80). Connected in parallel with the torque coils and the series resistor (82) is a parallel resistor (84) having a positive resistive temperature coefficient. Series resistor (82) and parallel resistor (84) are placed in close thermal communication with torque coil (30) and a magnetic circuit that includes stators (10 and 12) and permanent magnets (14). As the temperature of the accelerometer increases, less current flows through parallel resistor (84) and more current flows through the torque coil (30), thereby compensating for a reduced torque constant of torque coil that decreases with temperature, yet, enabling the resulting output current, $I_o$, to remain constant (for a given acceleration).

11 Claims, 7 Drawing Sheets

CLOSED LOOP TEMPERATURE COMPENSATION FOR ACCELEROMETER CURRENT SCALE FACTOR

TECHNICAL FIELD

This invention generally pertains to force balance servo accelerometers, and more specifically, to a method and apparatus for providing temperature compensation of such devices.

BACKGROUND OF THE INVENTION

The typical force balance accelerometer comprises a proof mass assembly that includes a reed suspended from a mounting system between upper and lower stators of a magnetic circuit. An example of such a prior art accelerometer is described in U.S. Pat. No. 3,702,073 and is shown herein (as prior art) in FIG. 1. In this accelerometer, the movable reed 26 is part of a unitary fused quartz structure that includes a flexure element 34 used to connect the reed to an annular support ring 20. The upper and lower surfaces 28 of the reed are plated with gold forming two capacitance plates. In addition, inwardly facing surfaces of the top and bottom stators 10 and 12 serve as corresponding capacitance plates, and together with the adjacent plated surfaces 28 of the reed, comprise two pairs of capacitors. Movement of reed 26 in respect to top and bottom stators 10 and 12 due to an acceleration directed along the acceleration sensitive axis deflects the reed and thus changes the capacitance of these two capacitors.

The upper and lower surfaces 28 of reed 26 also each include a torque coil 30. The torque coils are positioned on opposite surfaces of reed 26, with their centers aligned along a line that is generally normal to surfaces 28 and coincident with the acceleration sensitive axis of the accelerometer. The top and bottom stators 10 and 12 each include a permanent magnet 14 that extends into a cylindrical bore 32 of torque coils 30. An electrical current flowing through torque coils 30 interacts with permanent magnets 14, producing a torque that pivots reed 26 about its flexure element 34.

An acceleration acting along the acceleration sensitive axis produces a pendulous rotation of reed 26 and torque coils 30 with respect to stators 10 and 12. A servo-feedback circuit (not shown) senses the change in capacitance between reed 26 and stators 10 and 12 and produces an electrical current that is applied to torque coils 30 to return reed 26 to its neutral position between the top and bottom stators. The magnitude of this current thus directly corresponds to the magnitude of the acceleration along the acceleration sensitive axis, which initially caused the displacement of reed 26.

Each force balance accelerometer design has a characteristic torque constant that determines a current scale factor of the accelerometer. The permeability of stators 10 and 12, and the magnetic force of permanent magnets 14 greatly affect the torque constant and are highly sensitive to the effects of thermal variation. It is not uncommon for the magnetic circuit assembly to have a positive temperature coefficient that affects the current scale factor causing an error in the range from 100 to 200 ppm/°C. Significant errors can therefore arise in acceleration measurements due to changes in the permeability and magnetic force of the magnetic circuit assembly caused by temperature fluctuations.

Several steps can be taken to minimize the effects of the magnetic circuit assembly temperature coefficient. One of the more obvious solutions is to mount the accelerometer in a temperature controlled environment, e.g., in a temperature controlled oven, so that it experiences almost no change in temperature. Alternatively, if the output signal produced by the accelerometer is supplied to a computer, the affect of temperature on acceleration measurements can be compensated by measuring the temperature of the accelerometer and applying an appropriate correction factor developed by modeling the current scale factor as a function of temperature. Others have compensated for temperature effects by connecting a temperature dependent load resistor which is selected to have approximately an opposite temperature coefficient from that of the magnetic assembly to the output of the accelerometer. The latter approach reduces the affect of temperature variations on the voltage scale factor, i.e., the voltage developed across the temperature compensating load resistor per g of acceleration, but has little affect on the basic current scale factor, and therefore, the temperature compensating load resistor or other compensating load circuit must be changed if the voltage scale factor is changed.

U.S. Pat. No. 4,144,764 discloses a temperature compensated servo amplifier for an electrically damped accelerometer. The reference does not disclose any details concerning the nature of the temperature compensation; however, the temperature compensation is applied in parallel with a resistor connected to ground at the non-inverting input of an amplifier in the servo feedback loop of the system. This temperature compensation is therefore applied to the scale factor of the feedback loop. The amplifier in the servo loop permits the output impedance of the system to be relatively low, thereby providing a voltage output that varies with acceleration as opposed to a varying current output. As a result, selection of the voltage scale factor is limited.

A more complicated solution to the problem of temperature compensation is disclosed in U.S. Pat. No. 4,128,010. This reference discloses a temperature compensated force balance accelerometer that includes a non-inductive temperature sensing winding on a magnet. The winding is connected in a bridge input circuit to an amplifier that produces a current in an auxiliary winding. Current flow in the auxiliary winding augments the fields produced by the permanent magnet so as to maintain a constant magnetic field strength in respect to a torque coil as the temperature changes. This approach thus compensates for a reduction in the strength of the magnetic field produced by the permanent magnet due to a decrease in the permeability of the magnet with increasing temperature by adding magnetic flux produced by the auxiliary winding. However, considerable complexity is thus added to the more conventional design of a force balance accelerometer and a potential source for particle contamination from flaking of wire insulation of the conductor used in the auxiliary winding is thereby introduced into this accelerometer design.

Each of the above-noted solutions to the temperature compensation problem adds to the cost of the accelerometer and/or to the complexity of the acceleration monitoring system. A simpler approach that uses an existing accelerometer design and does not require significant post processing is much more desirable. Accordingly, temperature compensation of the accelerometer's current scale factor inside the servo loop should be accomplished without the need for modeling the affect of temperature on the magnetic circuit assembly, controlling temperature, or providing temperature dependent loads. These and other objects and advantages of the present invention will be apparent from the attached drawings and the Description of the Preferred Embodiment that follow.

SUMMARY OF THE INVENTION

In accordance with the present invention, a load independent temperature compensation system is provided for use with a force balance accelerometer that produces an output signal in response to an acceleration. The accelerometer includes a torque circuit, a magnetic circuit assembly, and a servo feedback loop. The temperature compensation system for use with the accelerometer includes means for providing a predefined impedance and a predefined resistance temperature coefficient for the torque circuit. Also included are a parallel resistor, disposed in close thermal communication with both the magnetic circuit assembly and the torque circuit, and connected in parallel with the torque circuit. The parallel resistor has a characteristic impedance substantially greater than the predefined impedance of the torque circuit and a characteristic resistance temperature coefficient that is larger than the predefined resistance temperature coefficient of the torque circuit. The close thermal communication of the parallel resistor with the magnetic circuit assembly and the torque circuit ensures that the parallel resistor is substantially at the same temperature as the magnetic circuit assembly and the torque circuit so that the impedance of the parallel resistor and the predefined impedance of the torque circuit change in opposite directions in response to the temperature of the magnetic circuit assembly. As a result, the effect of temperature on the output signal of the accelerometer is minimized.

The torque circuit comprises a torque coil. In one embodiment of the invention, the means for providing comprises a series resistor connected in series with the torque coil. The parallel resistor is thus connected in parallel with both the series resistor and the torque coil, and the series resistor has a resistance temperature coefficient that is substantially equal to zero.

In another embodiment, a series resistance connected in series with the torque coil has a temperature coefficient that varies non-linearly as a function of temperature. In this second embodiment, the series resistance comprises a first resistor and a second resistor connected in parallel. The first resistor has a resistance temperature coefficient that varies non-linearly with temperature, and the second resistor has a resistance temperature coefficient that is substantially equal to zero. Preferably, the first resistor comprises a thermistor that is disposed in thermal communication with the magnetic circuit assembly and with the torque coil.

The accelerometer also preferably includes an outer case in which the magnetic circuit and torque circuit are mounted. The parallel resistor is then disposed on the magnetic circuit assembly, between the magnetic circuit assembly and the outer case.

The series resistance is selected to have an impedance sufficient to adjust the resistance temperature coefficient of the torque circuit so that it is less than the resistance temperature coefficient of the parallel resistor.

In another form of the invention, the means for providing comprise a material that is used to form the torque coil. This material is selected for its characteristic resistance temperature coefficient properties so that the predefined resistance temperature coefficient of the torque circuit is less than the resistance temperature coefficient of the parallel resistor.

A method for temperature compensating an output signal of a force balance accelerometer that includes a torque circuit, a magnetic circuit assembly, and a servo feedback loop comprises steps that generally correspond to the functions provided by the elements of the temperature compensation system discussed above.

DESCRIPTION OF THE PREFERRED EMBODIMENT

Figure 1:
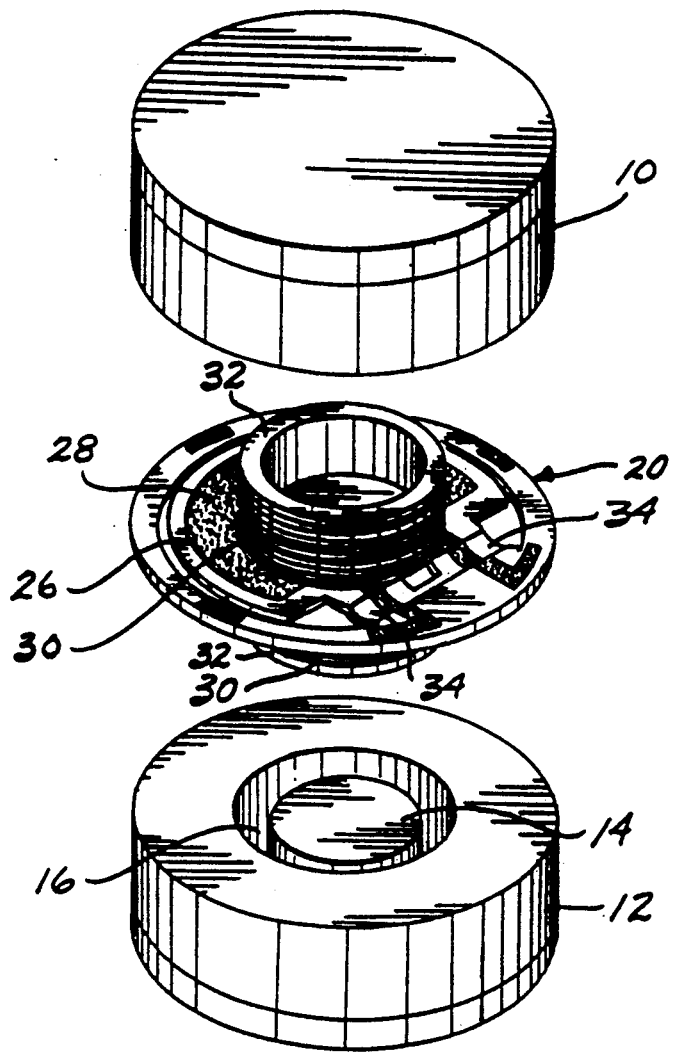
FIG. 1 is an exploded isometric view of a prior art force balance accelerometer to which the present invention is applicable.
Figure 2:
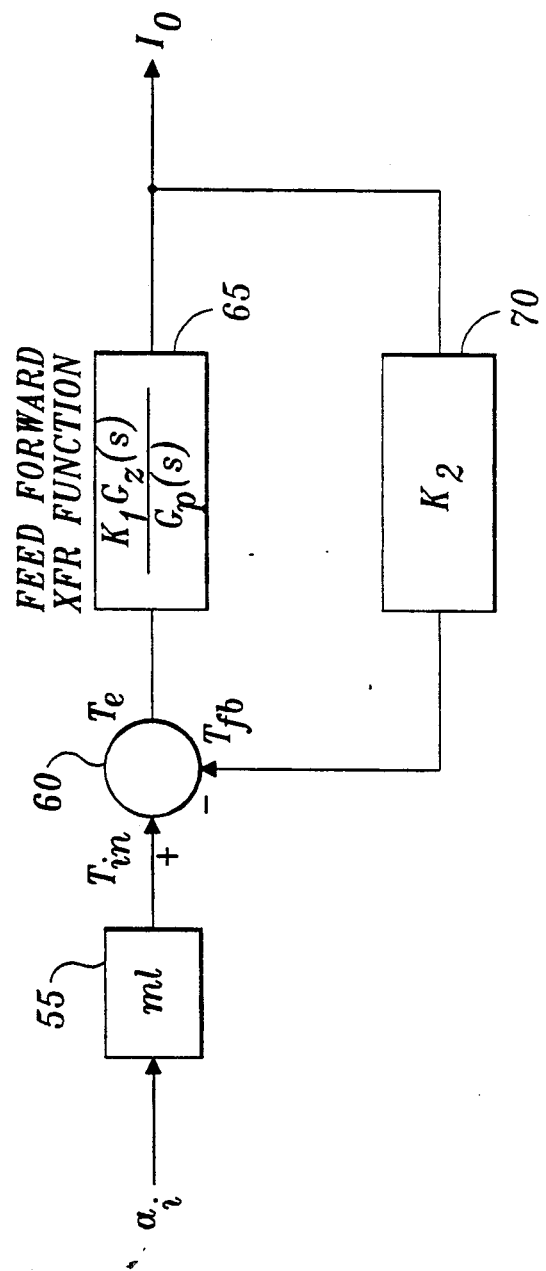
FIG. 2 is a control loop diagram illustrating the closed loop servo balance function implemented in the prior art accelerometer of FIG. 1.

FIG. 2 is a control loop diagram illustrating the transfer functions and their interconnected relationship in the prior art accelerometer of FIG. 1. In this prior art device, an input acceleration, $a_i$, acts on a block 55, which represents a mass imbalance (pendulosity) of the sensor, producing an input torque $\tau_{in}$. An output current $I_O$, acting through the torque coil and a torque constant, $K_2$, shown in a block 70, produce a restoring torque, $\tau_{fb}$, which is substracted from the input torque $\tau_{in}$ to produce an error torque $\tau_e$. A feed forward transfer block 65 acts on the error torque to produce the output current $I_O$. The closed loop transfer function (the ratio of the output current $I_O$ to the applied acceleration $a_i$) for the control system is given by Equation 1, as follows:

$$\frac{I_0}{a_i} = \frac{ml}{K_2} \left[ \frac{G_z(s)}{G_p(s)/K_1 K_2 + G_z(s)} \right] \quad (1)$$

In Equation 1, the term $G_z(s)$ represents feed forward zeroes of the transfer function, and the term $G_p(s)$ represents the feed forward poles of the function. The term $K_1$ is the gain constant for the feed forward transfer function. The terms contained within the square brackets only effect the frequency dependent response of the system, and therefore are not relevant in determining the temperature dependency of the system. The problem with the control system shown in FIG. 2 is that the torque constant $K_2$, that is, the feedback gain constant or the amount of torque produced by a given current to restore reed 26 in FIG. 1 back to a neutral position, decreases as the temperature of the accelerometer increases. Therefore, as temperature increases, more current is needed in order to produce the same amount of torque within the torque coil. As can be seen from Equation 1, if $K_2$ is decreasing, the magnitude of the transfer function will become larger. This increase in the magnitude of $I_O$ makes it appear as if the accelerometer is experiencing more acceleration than is actually the case. What is needed then is a way to compensate for the decreasing torque coil constant $K_2$ without resorting to complicated hardware or computer models.

Figure 3:
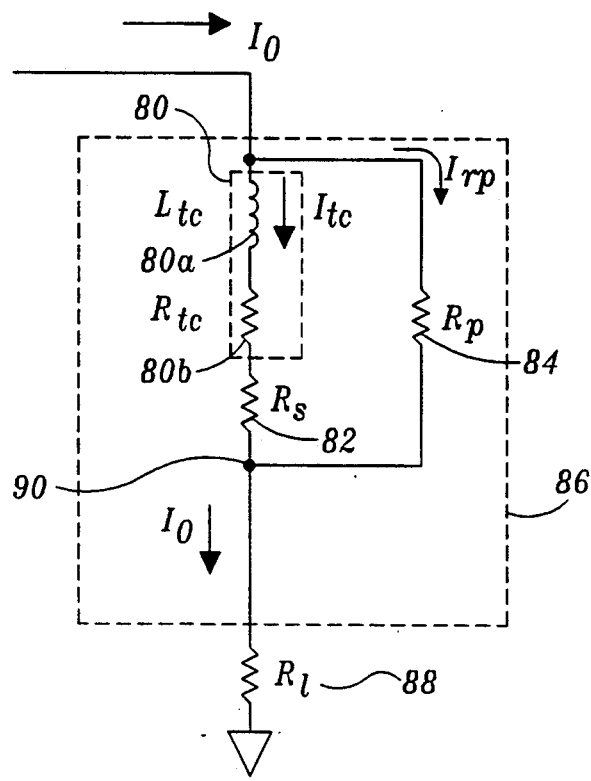
FIG. 3 schematically illustrates a first embodiment of the temperature compensation system of the present invention.

FIG. 3 shows a schematic diagram of a first embodiment of temperature compensation circuit 86 that is used to correct for errors due to a temperature dependent torque constant $K_2$. The torque coils 30 shown in FIG. 1 are electrically represented within a dashed block 80 as an inductor $L_{tc}$ 80a and a resistor $R_{tc}$ 80b connected in series. A resistor $R_s$ 82 is connected in series with the inductor $L_{tc}$ 80a and resistor $R_{tc}$ 80b. This series combination of resistors comprises the torque circuit resistance. A resistor $R_p$ 84 is connected in parallel with the series combination of inductor $L_{tc}$ 80a, resistor $R_{tc}$ 80b, and resistor $R_s$ 82 (torque circuit resistance). The resistors $R_p$ and $R_s$, in combination with $R_{tc}$, provide temperature compensation in accordance with the present invention. An output current $I_O$ delivered from an accelerometer output amplifier (not shown) divides into two paths, and includes a current $I_{tc}$ that flows through the torque circuit resistance, and a current $I_{rp}$ that flows around the torque circuit resistance through parallel resistor $R_p$ 84. The ratio of the current that flows through the torque circuit resistance, $I_{tc}$, to the total output current $I_O$ is given by the Equation:

$$\frac{I_{tc}}{I_O} = \frac{R_p}{R_{tc} + R_S + R_p} \left[ \frac{1}{sL_{tc}/(R_{tc} + R_S + R_p) + 1} \right] \quad (2)$$

Again, the terms contained within the square brackets only effect the frequency dependent portion of the transfer function and therefore are not relevant to the temperature response of the system. If parallel resistor $R_p$ 84 is selected to have a positive resistive temperature coefficient (RTC), which exceed that of the torque circuit resistance, then as the temperature of the system increases, less current flows through parallel resistor $R_p$ 84 and more current flows through the torque circuit resistance. Resistor $R_s$ 82 has a zero RTC. By correctly selecting a resistance value (for $R_s$) and a resistance value and RTC for parallel resistor $R_p$ 84, the increase in resistance of parallel resistor $R_p$ 84 as a result of an increase in temperature offsets the decreasing torque constant $K_2$ by diverting more current through the torque coil. Therefore, the temperature compensation system shown in FIG. 3 works by controlling current division between torque coil 80 and parallel resistor $R_p$ 84 as a function of temperature.

Close thermal communication between parallel resistor $R_p$ 84, the torque coils 30, and the magnetic circuit is essential to insure that temperature compensation circuit 86 properly tracks the temperature change driving $K_2$. A load resistor $R_l$ 88 is connected between a node 90, where series resistor $R_s$ 82 joins parallel resistor $R_p$ 84, and ground. Because the transfer function for the ratio of the currents $I_{tc}$ and $I_O$ given by Equation 2 is independent of load resistor $R_l$ 88, temperature compensation circuit 86 provides temperature compensation that is unaffected by the value of the load resistor.

In the first preferred embodiment, resistor $R_s$ 82 is preferably a metal film resistor, so that its resistance does not change over temperature; it functions only to reduce the overall RTC of the torque circuit to approximately 1900 ppm/°C. Resistor $R_p$ 84 is preferably a wire wound resistor using a material selected to have an RTC larger than that of the torque circuit by a desired correction factor.

TABLE 1

| | |
|---|---|
| $L_{tc} =$ | 1.5 mh (typical value); |
| $R_{tc} =$ | 80Ω, RTC = 3900 ppm/°C. (copper wire in the preferred embodiment); |
| $R_s =$ | 84Ω, RTC = 0 (thin film metal resistor); |
| $R_p =$ | 2460Ω, RTC = 3500 ppm/°C. (FENICULLOY ® wire); |
| $R_{total} =$ | 153Ω(@ 26° C.). |

Table 1 lists exemplary specifications for the temperature compensation resistors $R_s$ 82 and $R_p$ 84 used in the first preferred embodiment of the present invention to compensate for the temperature coefficient of $K_2$ using torque coils 30 that have the indicated $L_{tc}$, $R_{tc}$, and RTC characteristics.

Figure 4:
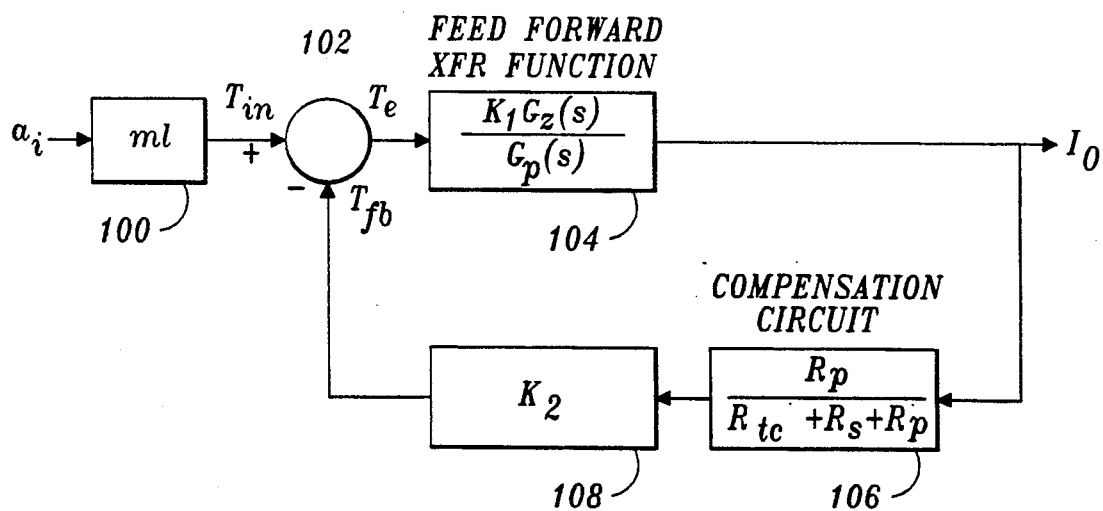
FIG. 4 is a control loop block diagram showing application of the current scale factor temperature compensation system in the servo feedback loop of a force balance accelerometer.

FIG. 4 shows the modified transfer function for a force balance accelerometer that includes temperature compensation circuit 86. In a block 100, an acceleration $a_i$ acting on a mass imbalance (pendulosity) ml, produces a torque input, $\tau_{in}$. The difference in the torque acting on reed 26 due to the acceleration and a torque feedback $\tau_{fb}$ is represented in a block 102 as producing torque error $\tau_e$. In a block 104, a transfer function acts on torque error $\tau_e$, producing output current $I_O$. A temperature compensation circuit block 106 operates on output current $I_O$, producing a current that is operated on by $K_2$ in a block 108, thereby developing the torque feedback signal $\tau_{fb}$. The transfer function of the control system shown in FIG. 4 is given by Equation 3, as follows:

$$\frac{I_O}{a_i} = \frac{ml}{K_2} \left(1 + (R_{tc} + R_S)/R_p\right) \left[ \frac{G_z(s)}{\frac{G_p(s)(R_p + R_{tc} + R_S)}{K_1 K_2 R_p} + G_z(s)} \right] \quad (3)$$

Since the terms contained within the square brackets of Equation 3 do not affect the temperature response of the control system, that part of the transfer function can be ignored. By placing temperature compensation circuit block 106 within the feedback path of FIG. 4, the effects of a decrease in $K_2$ (due to increasing temperature) in Equation 3 are offset by the term $(R_{tc}+R_s)/R_p$.

Figure 5:
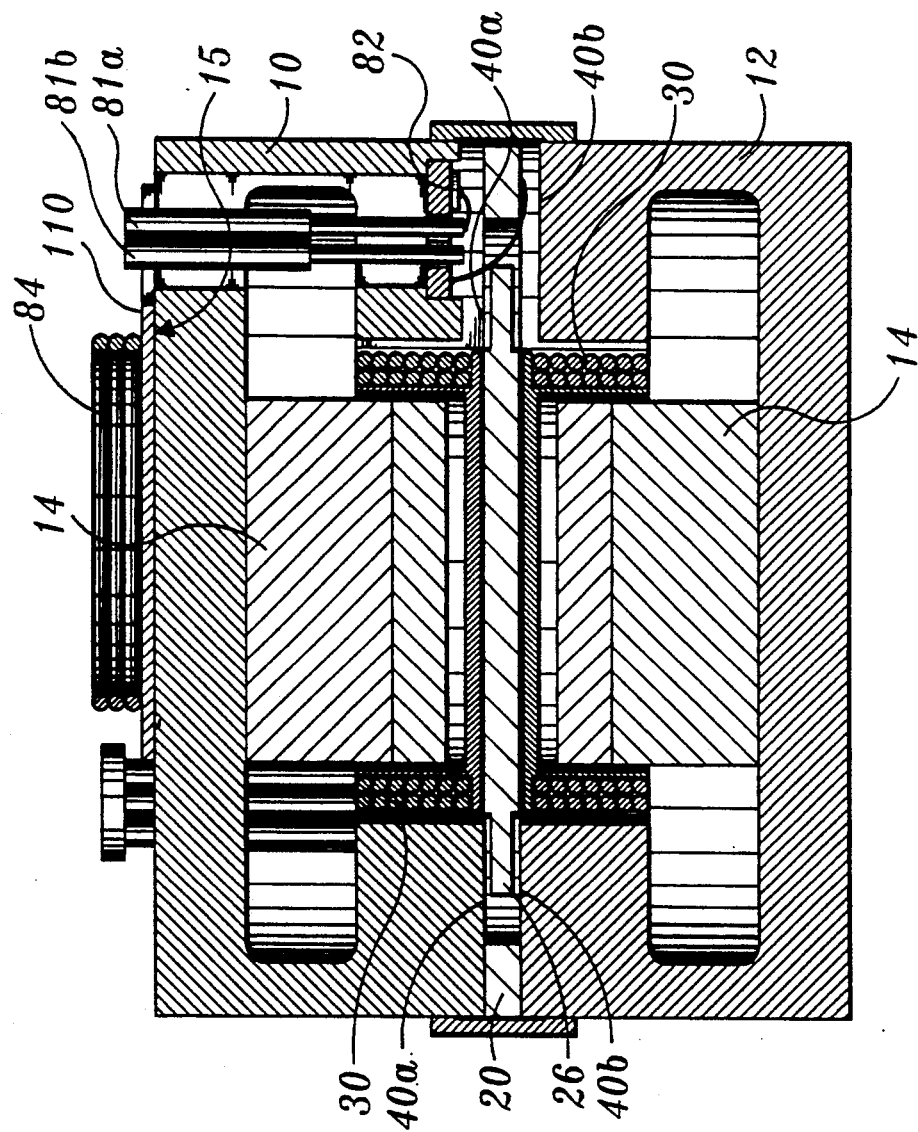
FIG. 5 is a cross-sectional view of the force balance accelerometer with the temperature compensation system of the present invention installed.

FIG. 5 is a cross-sectional view of an accelerometer, which includes temperature compensation circuit 86. Just like the prior art accelerometer of FIG. 1, the accelerometer in FIG. 5 includes movable reed 26 disposed within annular support ring 20. Likewise, the upper and lower surfaces of reed 26 are plated with gold to form a capacitor with respect to inwardly facing surfaces 40a and 40b of top and bottom stators 10 and 12, respectively. Movement of reed 26 with respect to upper and lower surfaces 40a and 40b of stators 10 and 12 changes the value of the capacitor and is used to sense displacement of reed 26 due to an acceleration. Cylindrical torque coils 30 are disposed around permanent magnets 14 that extend into center portion of the torque coils. An electrical current flowing through torque coils 30 interacts with permanent magnets 14 to produce a torque that pivots reed 26 about flexure 34 (not visible in this Figure).

Figure 5A:
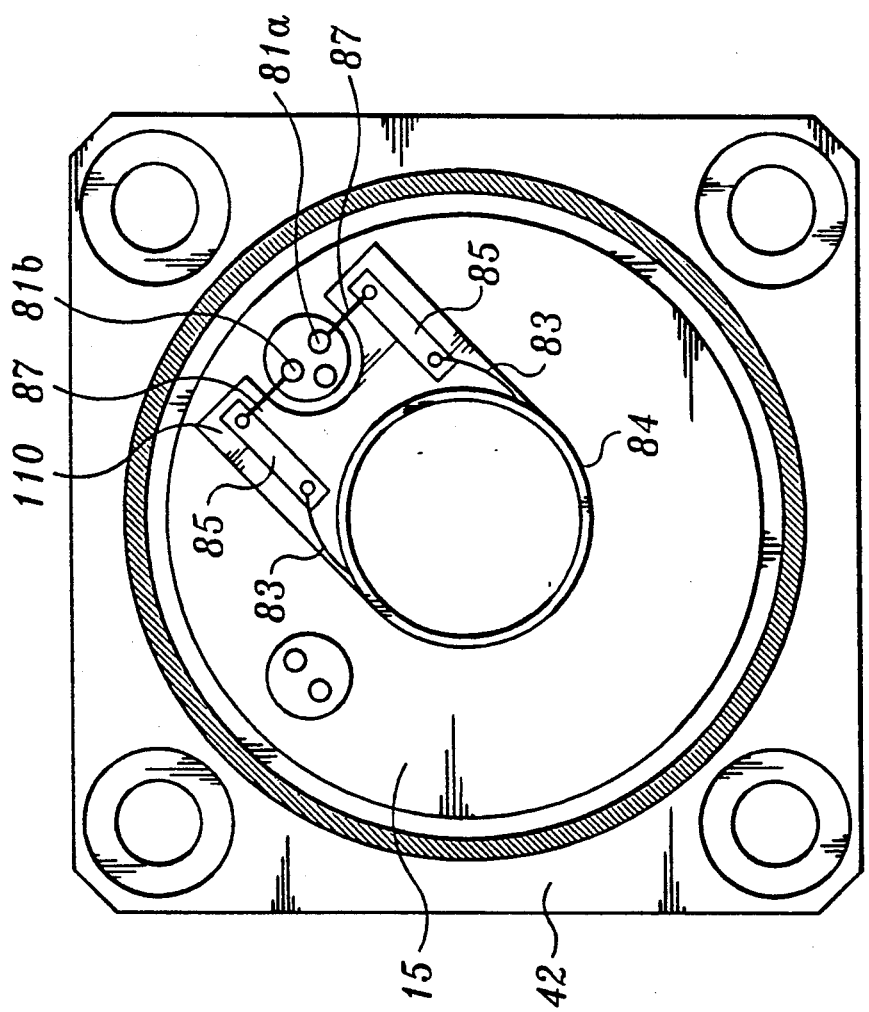
FIG. 5A is a cross-sectional view of the accelerometer taken along section lines A—A of FIG. 5.

Disposed on a top surface 15 of the accelerometer, as shown in FIG. 5A, is a plate 110 on which the parallel compensation resistor $R_p$ 84 is mounted. Leads 83, strips 85, and leads 87 electrically connect the parallel compensation resistor to posts 81. Plate 110 is adhesively or otherwise suitably attached in direct contact with the outer surface of stator 10 so as to insure good thermal conduction between torque coil 30, compensation resistors 82 and 84, and the magnetic circuit comprising stators 10 and 12 and permanent magnets 14. The attachment of plate 110 to stator 10 can, for example, be accomplished using a heat conductive adhesive, such as DELTA BOND ®. Series compensation resistor $R_s$ 82 is preferably a metal film, chip resistor connected in series with the torque coils at a post 81a. Parallel resistor $R_p$ 84 is disposed between a case 42 of the accelerometer and the magnetic circuit, and is externally connected between posts 81a and 81b. The parallel resistor is thus connected in parallel with the series connection of torque coils 30 and series resistor $R_s$ 82.

Figure 6:
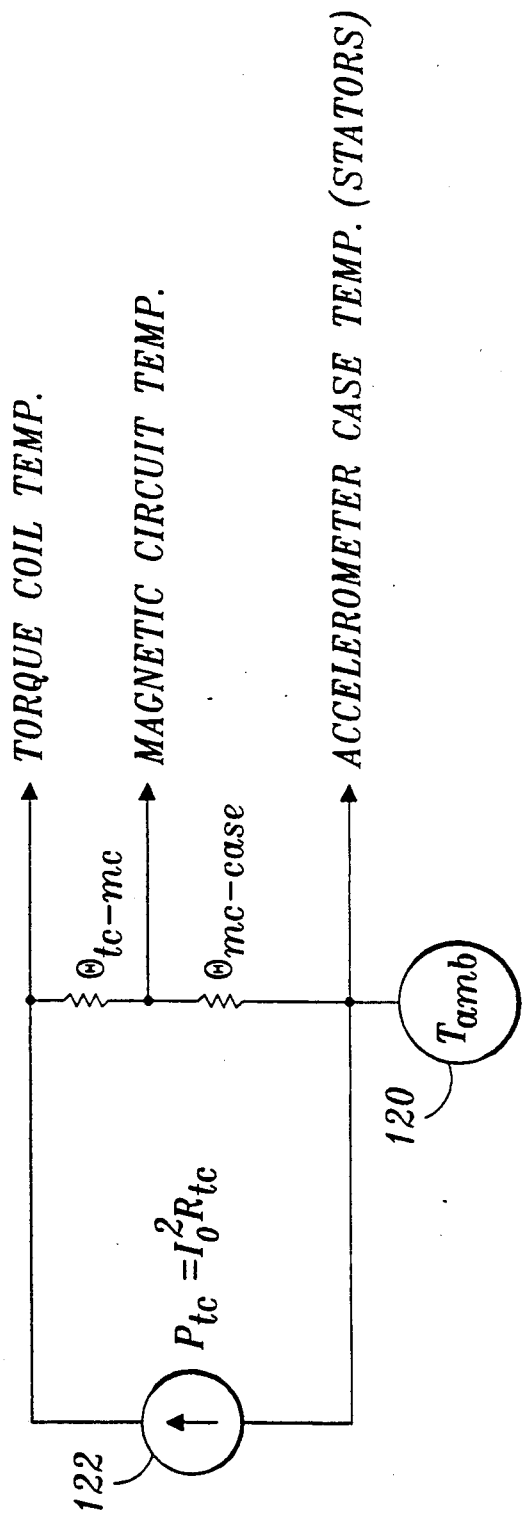
FIG. 6 illustrates a thermal diagram for the compensation circuit according to the present invention.

FIG. 6 is a thermal diagram of the basic accelerometer and temperature compensation circuit 86. The accelerometer case is subject to an ambient temperature $T_{amb}$, shown in a block 120, which is dependent on the temperature of the accelerometer surroundings. The thermal resistance between the torque coil and the magnetic circuit is $\theta_{tc-mc}$ and the thermal resistance between the magnetic circuit and the accelerometer case 42 is $\theta_{mc-case}$. Torque coil 30 and the magnetic circuit (stators 10 and 12, and permanent magnets 14) will be at the same temperature as the case if no power is being dissipated within the torque coil itself. In FIG. 6, the power dissipated within the torque coil $P_{tc}$ is shown on a block 122. If $P_{tc}$ is close to zero, then the temperature differential between the torque coil and the magnetic circuit, $(\theta_{tc-mc}) \times P_{tc}$, will be negligible, as will the temperature differential between the magnetic circuit and the accelerometer case, $(\theta_{mc-case}) \times P_{tc}$. As can be seen from FIG. 6, if little power is dissipated within the torque coil, then compensating resistors placed in close thermal communication with the magnetic circuit or on the stators will be at nearly the same temperature as the torque coil itself, thereby insuring good thermal tracking between the compensation resistors, the torque coil, and the magnetic circuit. The temperature differential caused by power dissipated in torque coils 30 is typically less than 20° C. per watt. However, the accelerometer (uncompensated) has a relatively low current scale factor, e.g., less than 1 mA/g. Accordingly, the total power $P_{tc}$ dissipated in torque coils 30 having an $R_{tc}$ equal to 80 ohms is very low, producing a near zero differential temperature between the magnetic circuit and torque coils.

It will be apparent that series compensation resistor $R_s$ is used to decrease the RTC of the torque circuit so that it is less than that of the parallel compensation resistor $R_p$. However, this invention also includes an embodiment (not separately shown), wherein the wire used to wind torque coils 30 is selected for its characteristic RTC properties so that the RTC of the torque coils alone is less than that of the parallel resistor. This embodiment does not require the series compensation resistor $R_s$. The material used in the wire to form the torque coils must be selected for its RTC properties, dependent upon the requirements imposed by the RTC used in the parallel compensation resistor.

TABLE 2

| | |
|---|---|
| $L_{tc} =$ | 1.5 mh; |
| $R_{tc} =$ | 80Ω, RTC = 3900 ppm/°C. (copper wire); |
| $R_{s1} =$ | 60Ω, RTC = 0; |
| $R_{s2} =$ | $2000 e^{\beta(\frac{1}{T} - \frac{1}{299})} \Omega, \beta = 4000$ |
| $R_p =$ | 2100Ω, RTC = 3200 ppm/°C. (FENICULLOY ® wire); |
| $R_{total} =$ | 129.7Ω @ 26° C. |

Figure 7:
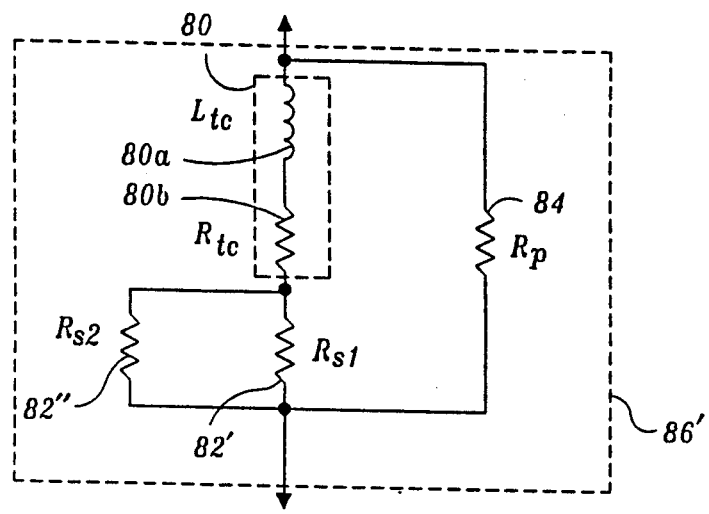
FIG. 7 schematically illustrates a second embodiment of the temperature compensation system according to the present invention.

FIG. 7 shows a second embodiment of the temperature compensation system according to the present invention. Once again, torque coils 30 are electrically represented within block 80 as the series combination of inductor $L_{tc}$ 80a and resistor $R_{tc}$ 80b. Connected in series with $R_{tc}$ 80b is the parallel combination of a compensation resistor $R_{s1}$ 82' and a compensation resistor $R_{s2}$ 82. Connected in parallel with torque coils 30 and the parallel combination of resistors $R_{s1}$ 82' and $R_{s2}$ 82 is a parallel resistor $R_p$ 84. The second embodiment of the invention comprise a temperature compensation circuit 86' that operates in much the same manner as the first embodiment described above, and thus, compensation resistors $R_{s2}$ 82 and $R_p$ 84 must again be closely thermally coupled to torque coils 30 and to the magnetic circuit comprising stators 10 and 12, and permanent magnets 14.

Table 2 sets forth specifications for the compensation resistors $R_{s1}$ 82', $R_{s2}$ 82, and $R_p$ 84, for use with torque coils 30 having the indicated parameters. Resistors $R_{s2}$ 82 is preferably a thermistor bead or other resistor having a non-linear negative RTC that is dependent upon temperature. Although Table 2 shows specifications for the compensation resistors used in one preferred embodiment, those skilled in the art will realize that other compensating resistors could be selected to compensate for torque coils having different parameters. Because the magnetic circuit and torque coils used in a particular design family of accelerometers typically have similar resistance characteristics and thermal effects, $K_2$, the same temperature compensation resistors can be used for the entire family, obviating the need to select different temperature compensation circuits 86 or 86' for each accelerometer.

Figure 8:
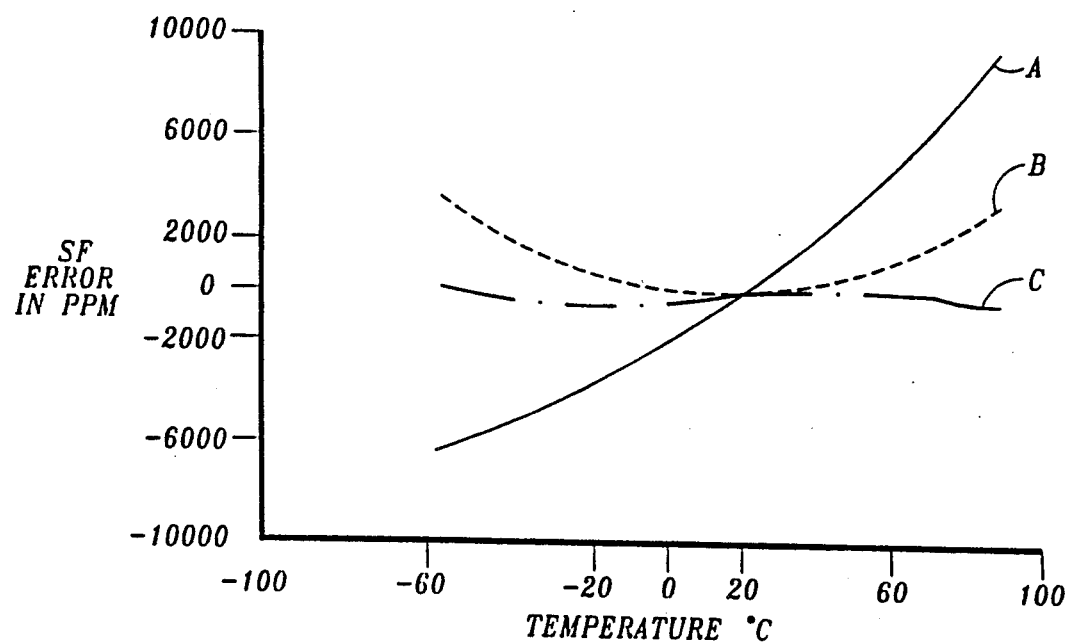
FIG. 8 is a graph illustrating the current scale factor error in ppm as a function of temperature in °C., for an uncompensated force balance accelerometer, compensation provided by the first embodiment, and compensation provided by the second embodiment.

FIG. 8 shows a graph of current scale factor error in parts per million (ppm) versus temperature for an accelerometer employing the temperature compensation according to the present invention. Line A is a graph of current scale factor error for a prior art accelerometer such as the one shown in FIG. 1 (with no temperature compensation). As can be seen from the graph, the current scale factor error of the prior art accelerometer varies greatly with temperature over the range from −60° C. to 100° C. Line B is a graph of current scale factor error for an accelerometer, employing temperature compensation circuit 86. The current scale factor error of the compensated accelerometer is greatly reduced and is nearly zero over a typical commercial operating range from $-20°$ C. to $60°$ C. Line C is a graph of the current scale factor error of accelerometer 8', employing temperature compensation circuit 86'. As can be seen, there is a further reduction in current scale factor error, causing it to be more nearly equal to zero over the range from $-60°$ C. to $100°$ C., due to the contribution of non-linear RTC of compensation resistor $R_{s2}$ 82.

Although the present invention has been described with respect to its preferred embodiments, those skilled in the art will realize that changes could be made without departing from the form and spirit of the invention. Therefore, it is intended that the scope of the invention only be limited by the following claims.

The invention in which an exclusive property or privilege is claimed is defined as follows:

1. A load independent temperature compensation system for use with a force balance accelerometer that produces an output signal in response to an acceleration and which includes a magnetic circuit assembly, a servo feedback loop, and a torque circuit having a predefined impedance and a predefined resistance temperature coefficient, comprising:

a parallel resistor, disposed in close thermal communication with both the magnetic circuit assembly and the torque circuit, and electrically connected to the torque circuit, the parallel resistor having an impedance substantially greater than the predefined impedance of the torque circuit and a resistance temperature coefficient that is larger than the predefined resistance temperature coefficient of the torque circuit, the close thermal communication of the parallel resistor with the magnetic circuit assembly and the torque circuit ensuring that the parallel resistor is substantially at the same temperature as the magnetic circuit assembly and the torque circuit so that the impedance of the parallel resistor and the predefined impedance of the torque circuit change in opposite directions in response to the temperature of the magnetic circuit assembly, thereby minimizing the effect of temperature on the output signal of the accelerometer, wherein the torque circuit comprises a torque coil, and wherein said compensation system includes a series resistor connected in series with the torque coil, the parallel resistor being connected in parallel with both the series resistor and the torque coil, and wherein the series resistor has a resistance temperature coefficient that is substantially equal to zero.

2. The temperature compensation system of claim 1, wherein the accelerometer includes an outer case in which the magnetic circuit assembly and torque circuit are mounted and wherein the parallel resistor is disposed on the magnetic circuit assembly, between the magnetic circuit assembly and the outer case.

3. A load independent temperature compensation system for use with a force balance accelerometer that produces an output signal in response to an acceleration and which includes a magnetic circuit assembly, a servo feedback loop and a torque circuit having a predefined impedance and a predefined resistance temperature coefficient, comprising:

a parallel resistor, disposed in close thermal communication with both the magnetic circuit assembly and the torque circuit, and electrically connected to the torque circuit, the parallel resistor having an impedance substantially greater than the predefined impedance of the torque circuit and a resistance temperature coefficient that is larger than the predefined resistance temperature coefficient of the torque circuit, the close thermal communication of the parallel resistor with the magnetic circuit assembly and the torque circuit ensuring that the parallel resistor is substantially at the same temperature as the magnetic circuit assembly and the torque circuit so that the impedance of the parallel resistor and the predefined impedance of the torque circuit change in opposite directions in response to the temperature of the magnetic circuit assembly, thereby minimizing the effect of temperature on the output signal of the accelerometer, wherein the torque circuit comprises a torque coil, and wherein said compensation system includes a series resistance connected in series with the torque coil, the parallel resistor being connected in parallel with both the series resistor and the torque coil, and wherein the resistance temperature coefficient of the series resistance varies non-linearly as a function of temperature.

4. The temperature compensation system of claim 3, wherein the series resistance comprises a first and a second resistor connected in parallel, and wherein the first resistor has a resistance temperature coefficient that varies non-linearly with temperature, and the second resistor has a resistance temperature coefficient that is substantially equal to zero.

5. The temperature compensation system of claim 4, wherein the first resistor comprises a thermistor that is disposed in thermal communication with the magnetic circuit assembly and the torque coil.

6. The temperature compensation system of claim 3, wherein the series resistance is selected to have an impedance sufficient to adjust the resistance temperature coefficient of the torque circuit so that it is less than the resistance temperature coefficient of the parallel resistor.

7. A method for temperature compensating an output signal of a force balance accelerometer that includes a torque circuit having a torque coil and a predetermined impedance and a predetermined resistance temperature coefficient, a magnetic circuit assembly, and a servo feedback loop, comprising the steps of:

providing a parallel impedance to the torque circuit;
mounting the parallel impedance in thermal communication with both the magnetic circuit assembly and the torque circuit, said parallel impedance being substantially greater than the predetermined impedance of the torque circuit and having a resistance thermal coefficient larger than the predetermined resistance temperature coefficient of the torque circuit, whereby a desired correction factor due to the parallel impedance appears in the servo feedback loop and therefore compensates for temperature errors in the accelerometer independently of any load connected to its output signal; and
providing a resistance in the torque circuit in series with the torque coil and selecting the series resistance so that it has a resistance temperature coefficient substantially equal to zero and an impedance appropriate to provide the predetermined impedance for the torque circuit.

8. The method of claim 7, wherein the accelerometer includes a case in which the magnetic circuit assembly is mounted, further comprising the step of mounting the parallel impedance between the magnetic circuit assembly and the case.

9. The method of claim 7, wherein the step of providing the predetermined impedance and the predetermined resistance temperature coefficient for the torque circuit comprises the step of selecting a material for forming the torque coil that has a resistance temperature coefficient appropriate to provide the predetermined resistance temperature coefficient for the torque circuit.

10. A method for temperature compensating an output signal of a force balance accelerometer that includes a torque circuit having a torque coil and a predetermined impedance and a predetermined resistance temperature coefficient, a magnetic circuit assembly, and a servo feedback loop, comprising the steps of:

providing a parallel impedance to the torque circuit; mounting the parallel impedance in thermal communication with both the magnetic circuit assembly and the torque circuit, said parallel impedance being substantially greater than the predetermined impedance of the torque circuit and having a resistance thermal coefficient larger than the predetermined resistance temperature coefficient of the torque circuit, whereby a desired correction factor due to the parallel impedance appears in the servo feedback loop and therefore compensates for temperature errors in the accelerometer independently of any load connected to its output signal; and providing a resistance in the torque circuit in series with the torque coil and selecting the series resistance so that it has a resistance temperature coefficient that is non-linear, and mounting the series resistance in close thermal communication with the magnetic circuit assembly.

11. The method of claim 10, wherein the step of selecting the series resistance includes the steps of selecting a first resistor and a second resistor that are connected in parallel with each other and in series with the torque coil, one of the first and the second resistors having a resistance temperature coefficient that is substantially equal to zero and the other having a characteristic resistance temperature coefficient that is non-linear.

* * * * *